Figure 7:
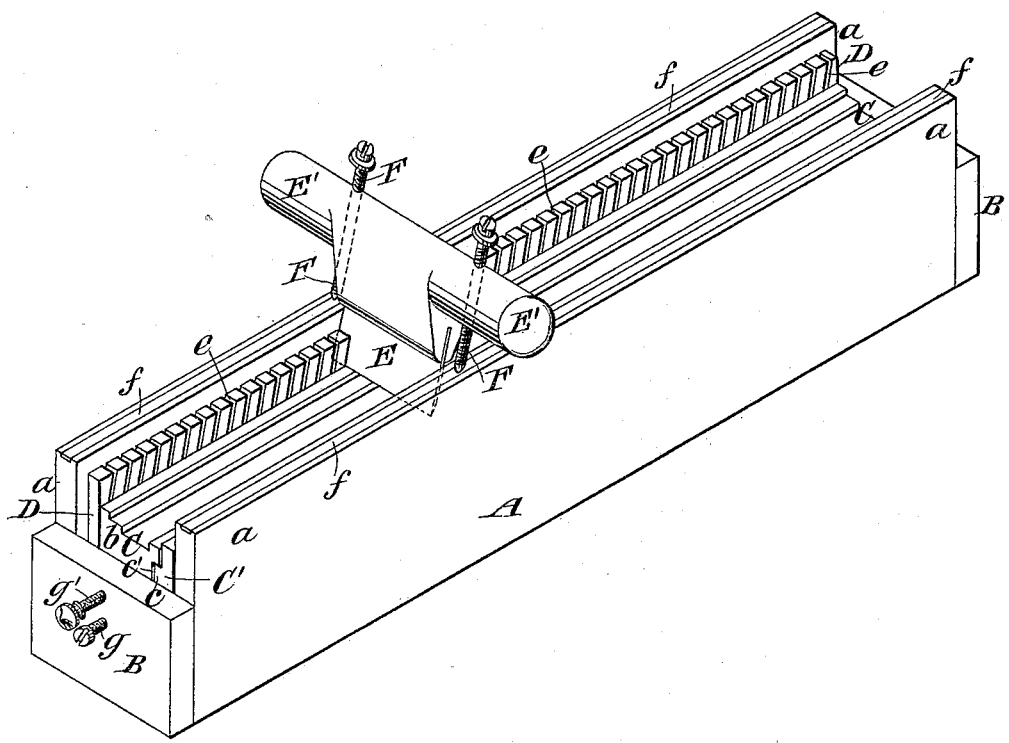

(No Model.) 2 Sheets—Sheet 1.
J. SWENSON.
DEVICE FOR CUTTING DAMPER FELTS FOR PIANOS.
No. 409,810. Patented Aug. 27, 1889.
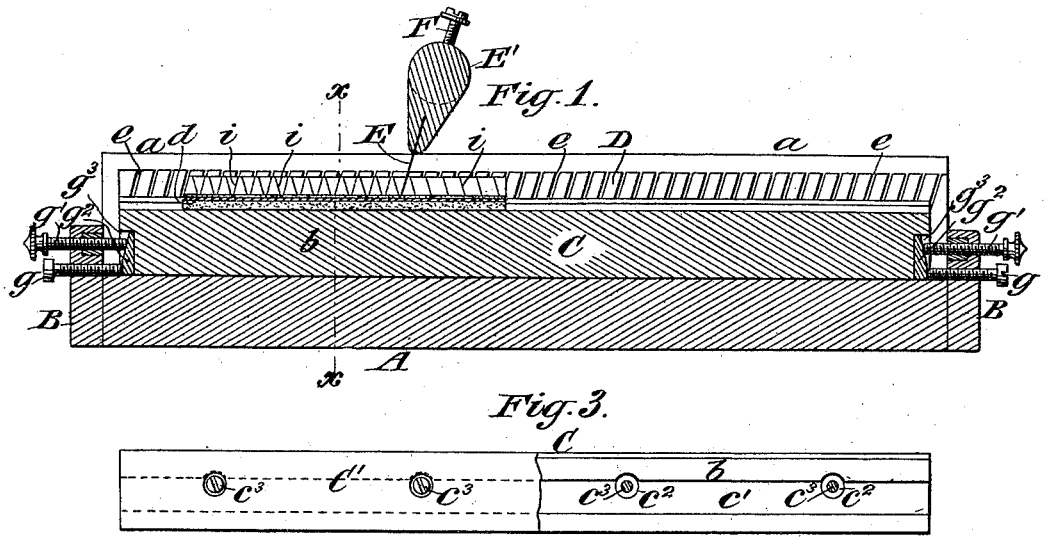
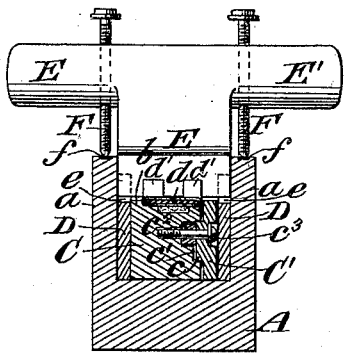
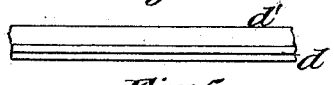
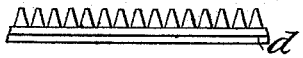
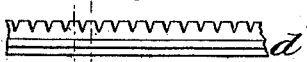
Witnesses:
O. Lundgren
John Birch
Inventor:
John Swenson
by his Attorneys
Brown & Griswold (No Model.) 2 Sheets—Sheet 2.
J. SWENSON.
DEVICE FOR CUTTING DAMPER FELTS FOR PIANOS.

No. 409,810. Patented Aug. 27, 1889.

Witnesses:
O. Sundgren
John Bieleh

Inventor:
John Swenson
by his Attorneys.
Brown & Griswold

UNITED STATES PATENT OFFICE.

JOHN SWENSON, OF NEW YORK, N. Y.

DEVICE FOR CUTTING DAMPER-FELTS FOR PIANOS.

SPECIFICATION forming part of Letters Patent No. 409,810, dated August 27, 1889.

Application filed April 20, 1889. Serial No. 307,971. (No model.)

*To all whom it may concern:*

Be it known that I, JOHN SWENSON, of the city, county, and State of New York, have invented a certain new and useful Improvement in Devices for Cutting Damper-Felts for Pianos, of which the following is a specification.

My present invention is an improvement upon a device for cutting damper-felts for pianos, a patent for which was granted to me May 6, 1884, No. 298,040.

In the accompanying drawings, Figure 1 is a vertical longitudinal section of a device for cutting damper-felts embodying my improvement. Fig. 2 is a transverse vertical section taken on the line $x\ x$, Fig. 1. Fig. 3 is a detail showing a certain holder comprised in the device. Fig. 4 is a side elevation of a piece of felt and its support adapted to be cut. Fig. 5 is a view of one form of the damper which may be cut in the device. Fig. 6 is a view of another kind of damper which may be cut. Fig. 7 is a perspective view of the device, looking from above.

Similar letters of reference designate corresponding parts in all the figures.

A designates a base-piece, which may be made of wood. Extending upwardly from the base-piece A, and along the sides thereof, are side pieces $a$, which, as here shown, are formed integral with the base-piece.

Secured to the ends of the base-piece, and also to the ends of the side pieces $a$, are end pieces B. The end pieces B extend upwardly for a distance above the base-piece A, so that there is formed between the base-piece A, the side pieces $a$, and the end pieces B a recess.

C designates a felt-holder, which felt-holder is adapted to be received within said recess. This felt-holder is of nearly the same length as said recess, and comprises a block $b$. Upon one side thereof the felt-holder is provided with a gripper $C'$. This gripper consists of a strip, which may be of wood, and is provided upon its inner side with a rib $c$, which rib, when the gripper is in place, extends into a groove $c'$, adapted to receive it, and formed in the side of the block $b$, and extending throughout the length thereof. The gripper $C'$ is yielding. I have shown a convenient means for causing it to yield, consisting in rubber washers $c^2$, arranged in cavities formed at the rear of the groove $c'$, and through which extend screws $c^3$, which screws pass through the gripper $C'$ and engage the block $b$; but any other suitable springs may be used. The upper side of the block $b$ is longitudinally grooved, in order to receive the lower portion or base $d$ of a card of felts $d'$ which it is desired to cut into dampers. The base $d$ is of the usual construction, and the felts to be cut are in strips, as usual.

When it is desired to insert the card of felts to be cut, the gripper $C'$ is moved slightly to one side, the card is then passed downwardly into the groove in the upper side of the block $b$, and the gripper being then released will grip the side edges of the base $d$ between itself and the opposite side edge of the groove, whereby the card of felts will be held firmly in place, as shown more clearly in Fig. 2.

Secured upon the inner sides of the side pieces $a$ are longitudinally-extending strips D, preferably of wood. The upper edge of the portions of said strips are provided with angularly and downwardly extending slits or grooves $e$, which slits or grooves are parallel to each other and extend throughout the lengths of the strips D. The angle at which the slits or grooves extend is such that if a knife be passed downwardly through the slits it will be caused to cut through the felt at the angle desired for the formation of the dampers. The slits or grooves $e$ in the strips D are arranged directly opposite each other, so that a knife being passed down to cut the dampers will be guided by a groove on each side.

E designates a knife which I have found convenient to use in cutting the felts. This knife is provided with transversely-extending handles $E'$, which may be grasped by both hands. Adjusting-screws F extend through the handles $E'$, the lower ends of which, when the knife is pressed downwardly to cut the felt, bear upon the upper sides of the side pieces $a$. I have shown metallic pieces $f$, extending lengthwise of the side pieces $a$ and upon the top thereof, which receive the impact of the set-screws when the knife is forced downwardly. By adjusting the said screws F cuts of any desired depth may be made in the felt. The felt having been properly secured upon the holder C, the latter is placed in the recess of the base and is adjusted into position to bring the felt where it may be most advantageously cut by the knife. When brought into such position, gage-screws $g$ are manipulated, which set the gage for the holder. Set-screws $g'$ are then operated to firmly secure the holder in place. The gage-screws $g$ and the set-screws $g'$ have bearings in the end pieces B, and, as shown, their inner ends contact with metallic pieces $g^2$ upon the ends of the holder C. The metallic pieces $g^2$ have angularly-extending grooves $g^3$, into which the set-screws $g'$ extend, and which tend to prevent the withdrawal of the holder. All having been arranged, the knife E is grasped and passed downwardly through the slits or grooves $e$ one after another, making a series of cuttings $i$ to the desired depth. All the cuttings $i$ having been made, the set-screws $g'$ are loosened, the holder is taken out and turned end for end, and a series of cuttings corresponding to the cuttings $i$ and extending at a reverse angle are formed, which cuttings cut out wedge-shaped portions of the felt and leave the card of dampers in a condition shown more clearly in Fig. 5, from which the individual dampers may be separated by cutting through the space between the dampers in the usual manner. Another kind of damper, in which the cuts are not so deep as those in Fig. 5, is shown in Fig. 6, and the lines upon which the individual dampers are afterward to be separated with a knife are shown in dotted lines.

What I claim as my invention, and desire to secure by Letters Patent, is—

1. In a device for cutting piano-dampers, the combination, with a base-piece provided with a recess, of a detachable holder within said recess, a gripper for gripping a card of felts to be formed into dampers, upright portions extending from said base, each provided upon their inner sides with a series of angularly-extending grooves arranged opposite each other, and a knife passing downwardly through said grooves successively to cut the felt, substantially as specified.

2. In a device for cutting piano-dampers, the combination, with a base provided with a recess, of a holder for cards of felt to be cut into dampers, a gripper for gripping said cards, adjusting-screws for adjusting said holder into position, and set-screws for retaining it in position when adjusted, substantially as specified.

3. In a device for cutting piano-dampers, the combination, with a base, of a holder for cards of felt to be cut into dampers, a gripper for gripping said cards, uprights extending upwardly above said base, each provided upon their inner sides with a series of angularly-extending grooves arranged opposite each other, a knife passing downwardly through said slits or grooves to cut the felt, and adjusting-screws bearing upon said uprights for varying the depth of the cut of the knife, substantially as specified.

JOHN SWENSON.

Witnesses:
    FREDK. HAYNES,
    C. E. SUNDGREN.